(12) United States Patent
Uchida et al.

(10) Patent No.: US 6,415,748 B2
(45) Date of Patent: Jul. 9, 2002

(54) EXHAUST CONTROL SYSTEM IN TWO-CYCLE INTERNAL COMBUSTION ENGINE

(75) Inventors: Hiroyuki Uchida; Shigeyuki Hara; Masaharu Ugai; Yasuo Sasamura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,120

(22) Filed: Jun. 6, 2001

(30) Foreign Application Priority Data

Jun. 6, 2000 (JP) ........................................ 2000-169322

(51) Int. Cl.⁷ ............................................... F02B 25/20
(52) U.S. Cl. ................................................... 123/65 PE
(58) Field of Search ............................ 123/65 PE, 65 P (56) References Cited

U.S. PATENT DOCUMENTS

| | | | | |
|---|---|---|---|---|
| 4,776,305 A | * | 10/1988 | Oike ....................... | 123/65 PE |
| 4,903,647 A | * | 2/1990 | Yamamoto et al. ...... | 123/65 PE |
| 5,829,394 A | * | 11/1998 | Oike et al. .............. | 123/65 PE |
| 6,253,718 B1 | * | 7/2001 | Uchida et al. .......... | 123/65 PE |
| 6,273,036 B1 | * | 8/2001 | Uchida et al. .......... | 123/65 PE |

* cited by examiner

Primary Examiner—Marguerite McMahon
Assistant Examiner—Hyder Ali
(74) Attorney, Agent, or Firm—Birch, Stewart, Kolasch & Birch, LLP (57) ABSTRACT

It is intended to provide an exhaust control system in a two-cycle internal combustion engine capable of suppressing the occurrence of irregular combustion when an opening timing of an exhaust port is set to a maximum delay timing, thereby improving the combustion stability and affording a high engine output when the opening timing of the exhaust port is set to a maximum advance timing. In the exhaust control system, an exhaust control valve has valve elements movable between their maximum projected positions at which a maximum delay timing of the exhaust ports is set and their maximum retracted positions at which a maximum advance timing of the exhaust ports is set. The valve elements are provided with control surfaces, that face a cylinder bore at the maximum projected positions of the valve elements to close upper port portions of the exhaust ports. Lower edges of the control surfaces are formed in a shape that substantially coincides with the shape of upper edges of the exhaust ports at the retracted positions of the valve elements. A pair of communication passages are formed in the valve elements, respectively, having first end portions, at the maximum projected positions of the valve elements, open to lower control surface portions positioned lower than top portions of the lower edges, and second, opposite end portions which are directly open to the exhaust passage.

18 Claims, 5 Drawing Sheets

EXHAUST CONTROL SYSTEM IN TWO-CYCLE INTERNAL COMBUSTION ENGINE

BACKGROUND OF THE INVENTION

1. Field of the Invention

The present invention relates to an exhaust control system provided with an exhaust control valve for controlling the opening/closing timing of an exhaust port in accordance with an operating condition of a two-cycle internal combustion engine.

2. Description of Background Art

In a conventional two-cycle internal combustion engine an exhaust control system is provided which has an exhaust control valve which changes the opening/closing timing of an exhaust port for preventing blow-by of fresh gas while the engine is operating under a condition where there is a small intake volume; for example, when the engine is operating at a low revolution. In addition, the opening/closing timing of the exhaust port has been controlled to ensure a high output while the engine is operating under a condition where there is a large intake volume; for example, when the engine is operating at a high revolution. An example of such an exhaust control valve will be described below with reference to FIG. 6.

Figure 6:
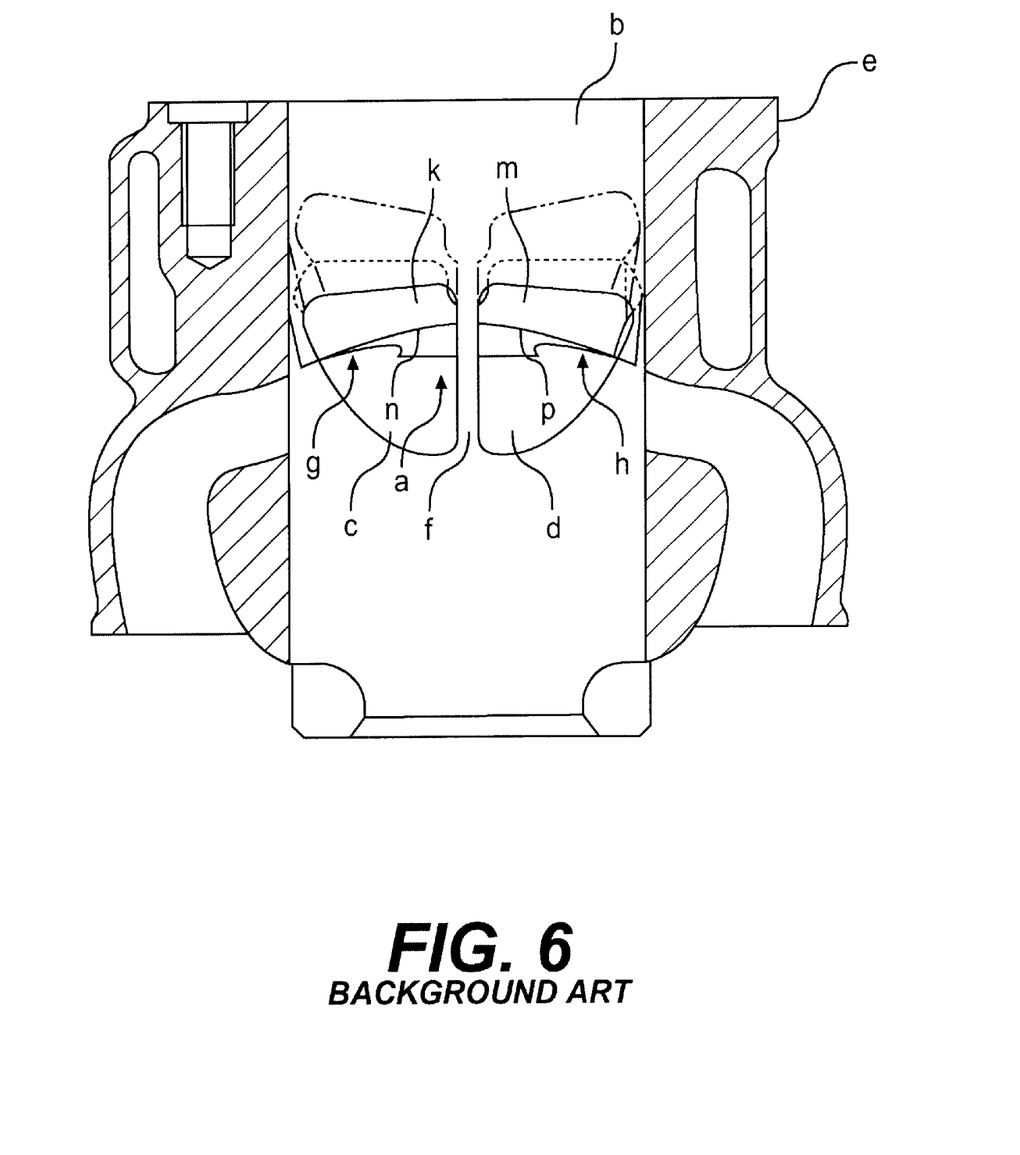
FIG. 6 is a sectional view illustrating an exhaust control system in a two-cycle internal combustion engine according to the background art.

This exhaust control valve, indicated at a, is swingably supported by a cylinder e, the cylinder e being formed with an exhaust passage having a pair of exhaust ports c and d which are open to a peripheral wall surface of a cylinder bore b with a piston fitted reciprocatably therein. The pair of exhaust ports c and d are positioned on both sides in the circumferential direction of a reinforcing wall f which extends axially on the circumferential wall of the cylinder bore b. The exhaust control valve a has a pair of valve elements g and h which are disposed correspondingly to the exhaust ports c and d.

At a predetermined number of revolutions in a low speed region of the internal combustion engine, the pair of valve elements g and h assume respective first positions indicated with solid lines in FIG. 6, in which control surfaces k and m of the valve elements g and h close upper port portions of the exhaust ports c and d so that an opening timing of the exhaust ports c and d is made at a latest point and a closing timing thereof is made at an earliest point, to suppress blow-by of fresh gas when the engine is at a small intake volume and improve the combustion stability. On the other hand, at a predetermined number of revolutions in a high speed region of the internal combustion engine, the control surfaces k and m of the valve elements g and h assume respective second positions indicated with dash-double dot lines in FIG. 6 and the control surfaces k and m open the upper port portions, so that the opening timing of the exhaust ports c and d is made at an earliest point and the closing timing thereof is made at a latest point, whereby the exchange of gases between burned gas and fresh gas by exhaust and scavenging when the engine is operating at a large intake volume is performed smoothly and positively and there is obtained a high engine output.

Lower edge portions n and p of the control surfaces k and m are formed in a shape that substantially coincides with the shape of upper edge portions of the exhaust ports c and d when the valve elements g and h assume their second positions. Therefore, when the valve elements g and h assume their first positions, the lower edge portions n and p of the control surfaces k and m are inclined downward from portions close to the reinforcing wall f to circumferential ends thereof. The reason why the lower edge portions n and p are formed so as to coincide with the shape of the upper edge portions of the exhaust ports c and d at the second positions of the valve elements g and h is that if the lower edge portions n and p of the control surfaces k and m are positioned above the upper edge portions of the exhaust ports c and d and a dead space is formed therebetween, output characteristics in a high speed region of the engine are deteriorated and a desired high output cannot be obtained. Although this has been made sure by experiment, the cause is presumed to be because of the fact that a smooth exhaust of burned gas does not occur under the influence of vortices created in the dead space.

When the piston moves down to a position lower than the center of the lower edge portions n and p, the exhaust ports c and d begin to be opened by the piston, the valve elements g and h being provided with the control surfaces k and m which include the lower edge portions n and p. In this state, circumferential ends of the exhaust ports c and d are still closed by the control surfaces k and m. With subsequent descent of the piston, the exhaust ports c and d are opened gradually from the center of the lower edge portions n and p toward end portions thereof.

Figure 5:
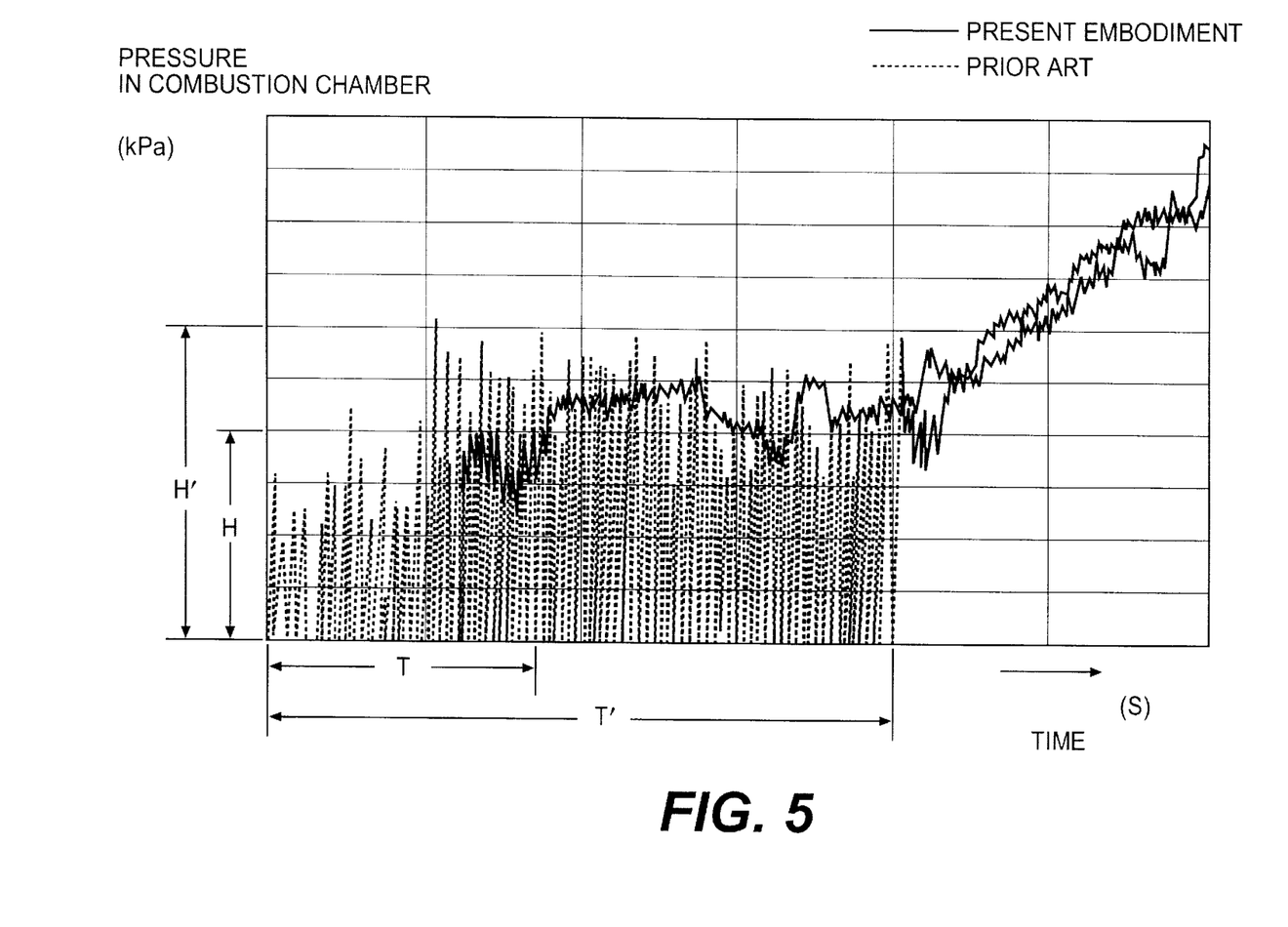
FIG. 5 is a graph showing changes in internal pressure of a combustion chamber from just after the start of opening of a throttle valve which is in an idle opening condition in a two-cycle internal combustion engine provided with an exhaust control system and assuming an idling state.

Having made an experiment in connection with the above background art, the inventors have obtained such results as indicated with broken lines in FIG. 5. The graph of FIG. 5 illustrates changes in internal pressure of a combustion chamber during the lapse of time just after the start of opening of a throttle valve, which is in an idle opening condition in a two-cycle internal combustion engine provided with an exhaust control valve and assuming an idling state. In the same figure, in a period T' which starts just after the start of opening of the throttle valve, the internal pressure of the combustion chamber varies largely at a variation width H' and it can be seen that unstable combustion involving alternate occurrence of misfire and combustion in the next cycle of gas left unburned by the misfire, i.e., irregular combustion, occurs over a relatively long period. The misfire is caused by retention of an excess of burned gas in the cylinder bore b. At least during this period T', the number of revolutions of the internal combustion engine is smaller than a predetermined number of revolutions in the foregoing low speed region, so that the valve elements g and h of the exhaust control valve occupy their first positions. Thus, the reason why such irregular combustion occurs when the valve elements g and h of the exhaust control valve occupy their first positions is presumed to be because the exhaust ports c and d are opened later at circumferential ends than at the center thereof. This is attributable to the shape of the lower edge portions n and p of the control surfaces k and m, in the vicinity of the late opening portions in the cylinder bore b. Accordingly, exhaust and scavenging are not conducted to a satisfactory extent, resulting in excess burned gas remaining within the cylinder bore b, thus facilitating the occurrence of irregular combustion.

In order to improve the exhaust and scavenging functions, if downwardly extending portions from both circumferential ends of the control surfaces k and m are shortened to quicken the timing at which circumferential ends of the exhaust ports c and d are opened, the period of occurrence of irregular combustion decreases. However, when the valve elements g and h assume their second positions in the high speed region, the foregoing dead space occurs, thus making it impossible to obtain a desired high output of the internal combustion engine throughout the entire operating range.

SUMMARY OF THE INVENTION

The present invention has been accomplished in view of the above-mentioned circumstances and it is an object of the invention to provide an exhaust control system in a two-cycle internal combustion engine capable of suppressing the occurrence of irregular combustion when the opening timing of the exhaust ports is set to a delay timing including a maximum delay timing, to improve the combustion stability. Furthermore, it is an object of the present invention to afford a high engine output when the opening timing of exhaust ports is set to a maximum advance timing.

A first aspect of the present application resides in an exhaust control system in a two-cycle internal combustion engine which includes an exhaust control valve disposed in a cylinder thereof to control the opening/closing timing of an exhaust port. The cylinder is formed with an exhaust passage having an exhaust port, the exhaust port being formed in a peripheral wall surface of a cylinder bore and adapted to be opened and closed by a piston, the piston being fitted into the cylinder bore reciprocatably. Furthermore, the exhaust control valve has a valve element movable between a most projected position and a most retracted position within the exhaust passage, the valve element having a control surface which, when the valve element assumes the most projected position, faces the cylinder bore and closes an upper port portion of the exhaust port and which, when the valve element assumes the most retracted position, opens the upper port portion. A lower edge portion of the control surface has a top portion and a lower portion which respectively assume a top position and a position lower than the top position when the valve element occupies the maximum projected position, the opening timing of the exhaust port being set to a maximum delay timing when the valve element occupies the maximum projected position and being set to a maximum advance timing when the valve element occupies the maximum retracted position, wherein the lower edge portion of the control surface is formed in a shape which substantially coincides with the shape of an upper edge portion of the exhaust port when the valve element occupies the most retracted position. In addition, the valve element is formed with a communication passage, one end of which, when the valve element occupies the maximum projected position, opens to a lower control surface portion of the control surface positioned lower than the top portion and the other end of which opens to the exhaust passage directly.

According to the first aspect of the present application, during the period from the state in which the valve element of the exhaust control valve occupies the maximum projected position until when one end portion of the communication passage is fully closed by the cylinder formed with the upper edge portion of the exhaust port, and while the opening timing of the exhaust port is set to the delay timing including the maximum delay timing, the exhaust port is opened later than the opening timing of the exhaust port at the top of the lower edge portion by means of the piston which is in a descending stroke, at the lower portion of the lower edge portion located near the position where one end portion of the communication passage opens in the lower control surface portion. Consequently, burned gas present near the lower control surface portion in the cylinder bore flows out directly to the exhaust passage through the communication passage at a timing earlier than in the background art and in an amount larger by an amount corresponding to the flow in the communication passage, whereby the exhausting action near the lower control surface portion in the cylinder bore is improved, the scavenging action which follows the exhaust is also improved, the amount of residual burned gas is reduced, and the occurrence of irregular combustion is suppressed.

Even in the event of occurrence of irregular combustion, the amount of unburned gas (air-fuel mixture) remaining within the cylinder bore during misfire decreases by an amount corresponding to an outflow from the communication passage to the exhaust passage. Therefore, in the next cycle, the intake volume in the cylinder bore, which is the sum of the amount of remaining unburned gas and the amount of fresh gas newly introduced, becomes smaller than that in the background art and the combustion pressure becomes low. Accordingly, the variation range of the internal pressure in the combustion chamber upon occurrence of irregular combustion becomes narrower and vibrations caused by irregular combustion are diminished. When the valve element of the exhaust control valve assumes its retracted position and the opening timing of the exhaust port is set to the maximum advance timing, the lower edge portion of the control surface substantially coincides with the upper edge portion of the exhaust port, so that a dead space is not formed by the valve element and the exhaust port and the exhaust of burned gas is performed smoothly and positively by both exhaust and scavenging actions in the piston descending stroke.

As a result, when the opening timing of the exhaust port is set to the delay timing, including the maximum delay timing, by the exhaust control valve, the amount of residual gas in the vicinity of the lower control surface portion within the cylinder bore decreases, whereby the occurrence of irregular combustion is suppressed to improve the combustion stability and shorten the occurrence period of irregular combustion. Consequently, the total amount of unburned gas discharged by misfiring during the irregular combustion period decreases and hence the fuel economy and exhaust emission are improved. In addition, since the range of pressure variation in the combustion chamber upon occurrence of irregular combustion becomes narrower, vibrations attributable to irregular combustion are diminished. Furthermore, when the opening timing of the exhaust port is set to the maximum advance timing by the exhaust control valve, burned gas is discharged from the exhaust port smoothly and positively, so that a high engine output is obtained.

According to a second aspect of the present application, in addition to the first aspect, an exhaust control system in a two-cycle internal combustion engine includes a top portion positioned near a circumferential center of the exhaust port. The communication passage comprises a pair of communication passages which are a pair of through holes independent of each other. Furthermore, first ends of the communication passages are open, respectively, to positions near both peripheral end-side edges in the lower control surface portion located close to both circumferential end-side edges of the exhaust port.

According to the second aspect of the present application, there are obtained the following effects in addition to the effects of the first aspect of the present application. At the lower portion near both circumferential end-side edges in the lower control surface portion to which are open the first end portions of the paired communication passages constituted by a pair of mutually independent through holes, the exhaust port is opened later than the opening timing of the exhaust port at the top portion of the lower edge located near the center of the exhaust port, by means of the piston which is descending. Furthermore, both circumferential end-side edges are positioned near the circumferential side edge of the exhaust port. Therefore, burned gas present near the circumferential end-side edges where the gas exhibits a relatively small fluidity in the cylinder bore, flows out through the communication passages to the exhaust passage at an earlier timing than in the background art and in an amount larger by an amount corresponding to the flow in the communication passages. Accordingly, in a portion included in a wide circumferential range centered at the center of the exhaust port within the cylinder bore and where the fluidity of gas is relatively low, both exhaust and scavenging actions are improved and the amount of burned gas remaining within the cylinder bore decreases, whereby the occurrence of irregular combustion is suppressed effectively.

As a result, the amount of residual burned gas decreases in a portion included in a wide circumferential range centered at the center of the exhaust port within the cylinder bore and where the fluidity of gas is relatively low. Accordingly, in connection with the effects of the first aspect of the present application, the occurrence of irregular combustion is suppressed effectively, the combustion stability is improved, and the period of occurrence of irregular combustion is shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An embodiment of the present invention will be described hereinbelow with reference to FIGS. 1 to 5.

Figure 1:
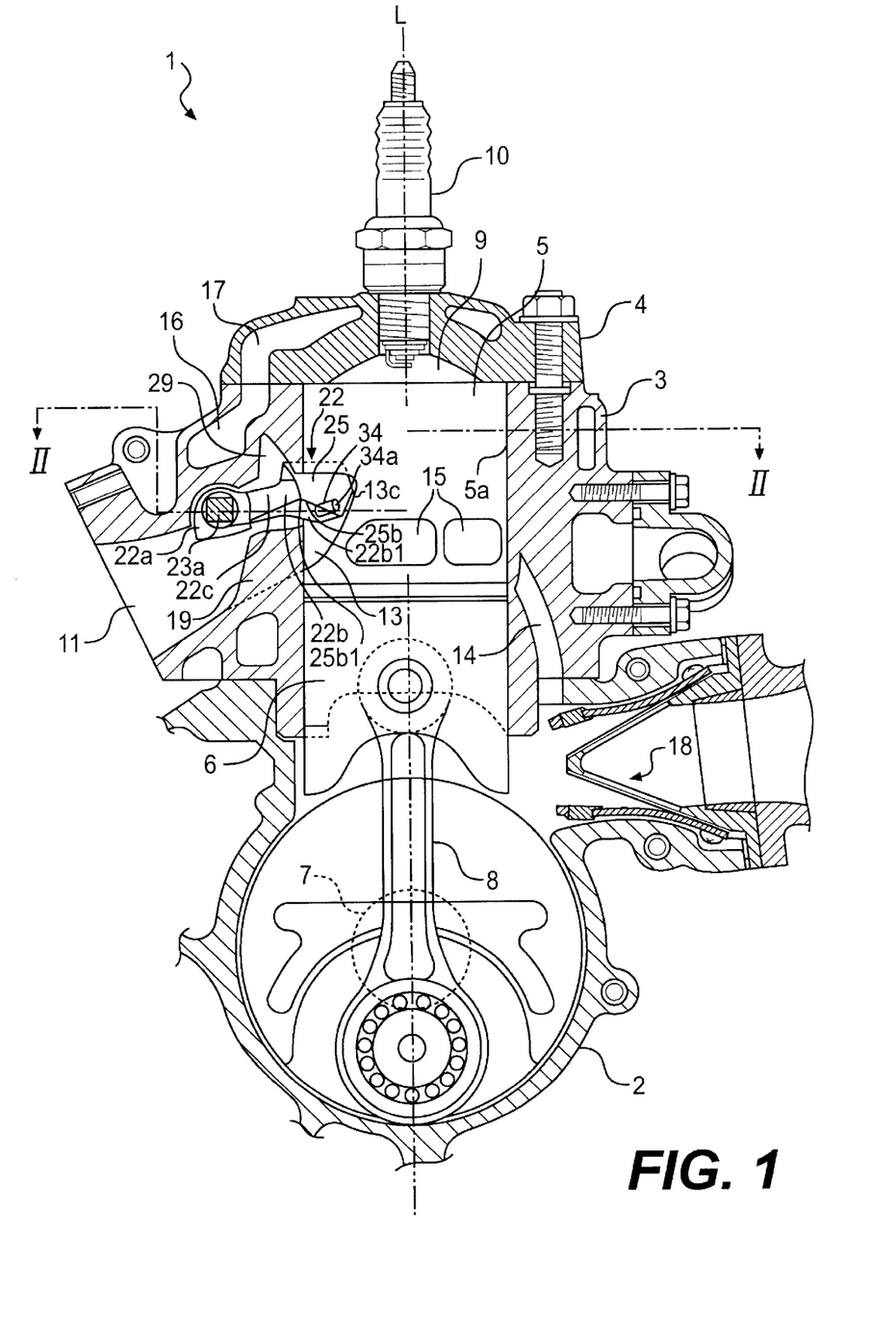
FIG. 1 is a sectional view taken on line I—I in FIG. 2 of a two-cycle internal combustion engine having an exhaust control system according to the present invention.
Figure 2:
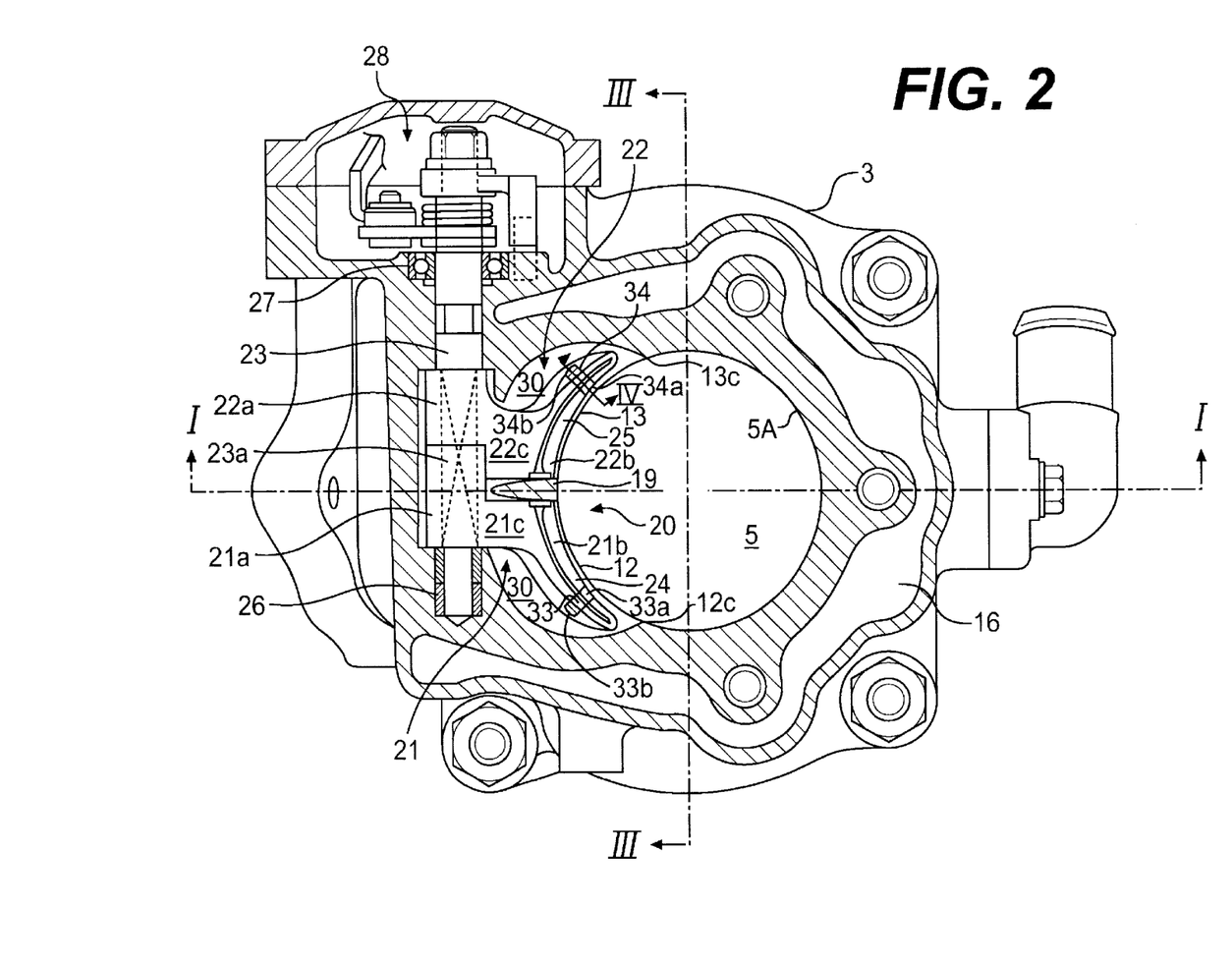
FIG. 2 is a sectional view taken on line II—II in FIG. 1.
Figures 3, 4:
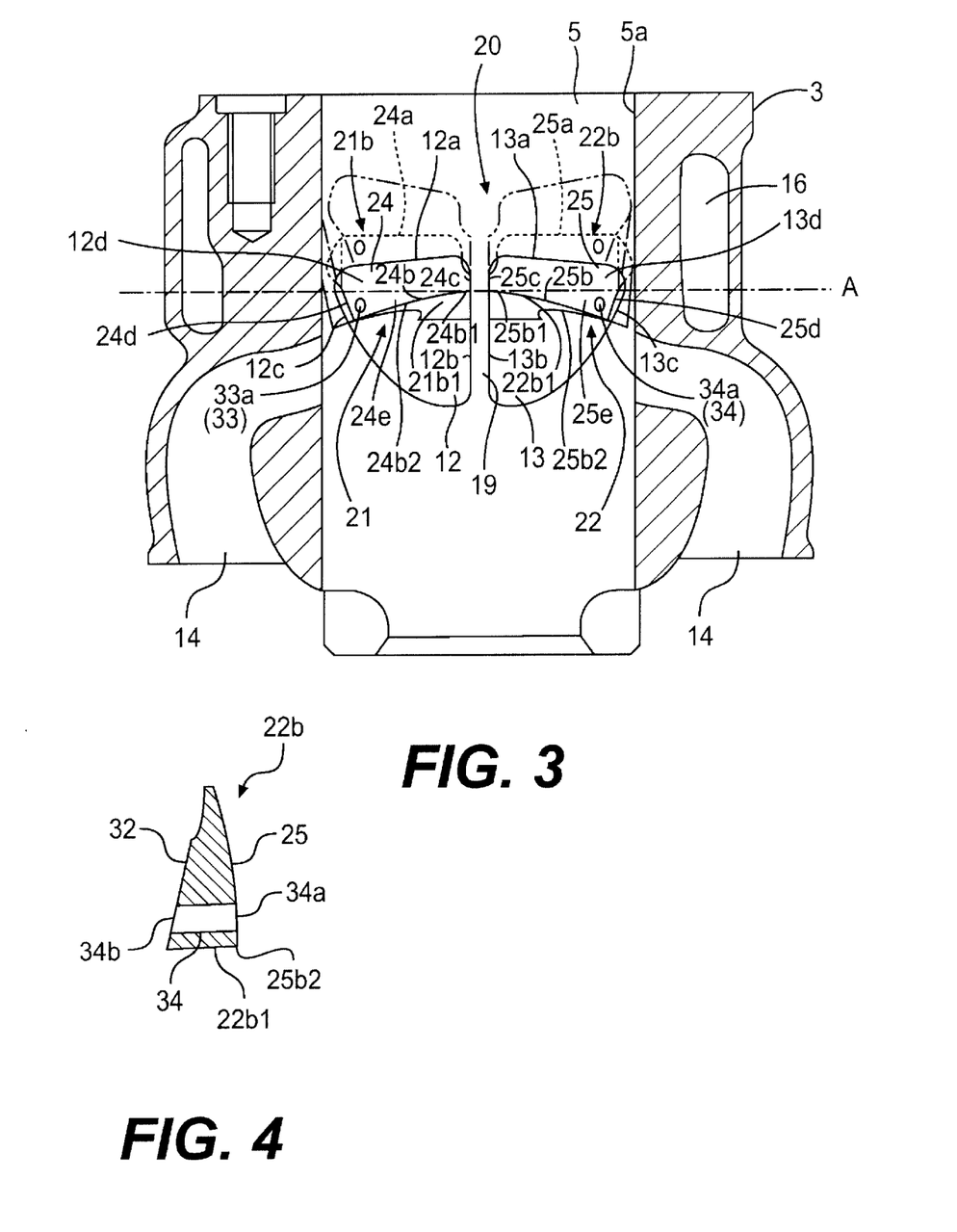
FIG. 3 is a sectional view taken on line III—III in FIG. 2.
FIG. 4 is a sectional view taken on line IV—IV in FIG. 2.

FIG. 1 is a sectional view taken on line I—I in FIG. 2 of a two-cycle internal combustion engine having an exhaust control system according to the present invention, FIG. 2 is a sectional view taken on line II—II in FIG. 1, FIG. 3 is a sectional view taken on line III—III in FIG. 2, FIG. 4 is a sectional view taken on line IV—IV in FIG. 2, and FIG. 5 is a graph showing changes in internal pressure of a combustion chamber from just after the start of opening of a throttle valve which is in an idle opening state in a two-cycle internal combustion engine provided with an exhaust control system and being in an idling condition. For the sake of convenience, the words "upper" and "lower" as referred to herein mean "upper" and "lower" respectively shown in FIG. 1. For example, an upper side of a cylinder means a cylinder head side of the cylinder, while a lower side of the cylinder means a crank case side of the cylinder. "Axial" or "axial direction" means an axial direction of a cylinder bore and "circumferential" or "circumferential direction" means a circumferential direction centered on the axis of the cylinder bore.

Referring to FIGS. 1 to 3, a two-cycle internal combustion engine 1 is a single-cylinder water-cooled internal combustion engine mounted on such a vehicle as a motorcycle. The internal combustion engine is provided with a crank case 2, a cylinder 3 mounted to an upper end face of the crank case 2, and a cylinder head 4 mounted to an upper end face of the cylinder 3. A piston 6 is fitted into a cylinder bore 5 slidably and reciprocatably and is connected through a connecting rod 8 to a crank shaft 7 which is accommodated and rotatably supported within the crank case 2. An ignition or spark plug 10 is threadedly engaged with the cylinder head 4 so as to face a combustion chamber 9. In the cylinder 3 are formed an exhaust passage 11 having a pair of exhaust ports 12 and 13 which are open to a peripheral wall surface 5a of the cylinder bore 5 and which are opened and closed by the piston 6, a scavenging passage 14 having a plurality of scavenging ports 15 which are open to the peripheral wall surface 5a of the cylinder bore 5 and which are opened and closed by the piston 6, and a cooling water jacket 16. The cooling water jacket 16 is in communication with a cooling water jacket 17 formed in the cylinder head 4.

An air-fuel mixture fed from a carburetor (not shown) is introduced into the crank case 2 through a reed valve 18. The air-fuel mixture is then compressed within the crank case 2, passed through the scavenging passage 14, and from the scavenging port 15 into the cylinder bore 5 toward the side radially opposite to the exhaust ports 12 and 13 formed in the peripheral wall surface 5a of the cylinder bore 5. Thus, scavenging is performed in accordance with what is known as the Schnurle scavenging method.

A reinforcing wall 19 extending axially between the paired exhaust ports 12 and 13 is integral with the cylinder 3 and both exhaust ports 12 and 13 are generally symmetric with respect to an axial straight line passing through the center of the reinforcing wall 19. An exhaust control valve 20 which constitutes a part of the exhaust control system is disposed at a portion of the cylinder 3 which forms an upper passage wall of the exhaust passage 11 at a position downstream of both exhaust ports 12 and 13. As shown in FIGS. 2 and 3, the exhaust control valve is composed of a pair of valve elements 21 and 22 disposed to sandwich the reinforcing wall 19 therebetween. A valve stem 23 is inserted through axial bores formed in boss portions 21a and 22a of the valve elements 21 and 22. The valve elements 21 and 22 are integrally molded members, wherein control portions 21b and 22b positioned close to the cylinder bore 5 are contiguous to the boss portions 21a and 22a through connecting portions 21c and 22c. The control portions 21b and 22b are formed in a projecting shape with respect to the connecting portions 21c and 22c and extend to a greater extent in the circumferential direction than the connecting portions 21c and 22c, centered at the reinforcing wall 19. In addition, the control portions 21b and 22b have control surfaces 24 and 25, respectively, which are substantially contiguous to the peripheral wall surface 5a of the cylinder bore 5 and which have substantially the same curvature as that of the wall surface 5a. The control surfaces 24 and 25 are formed in a shape approximately symmetric with respect to an axial straight line passing through the center of the reinforcing wall 19.

The valve stem 23, which is positioned behind the reinforcing wall 19, is supported at both end portions thereof by two bushings 26 and a ball bearing 27, respectively, and is thereby supported rotatably in the cylinder 3. The valve stem 23 has a rotational center line which lies on a plane orthogonal to an axis L of the cylinder bore 5, which in this embodiment corresponds to a rotational center line approximately parallel to the rotational axis of the crank shaft 7. As shown in FIG. 1, an intermediate portion of the valve stem 23 is formed as a square stem 23a having a square section. Axial bores of the boss portions 21a and 22a of both valve elements 21 and 22, which are also square in section, are fitted on the square stem 23a in series with the axial direction of the valve stem 23 in a mutually abutted state of adjacent ends of the boss portions 21a and 22a, whereby both valve elements 21, 22 and the valve stem 23 perform an integral motion about the rotational center line.

Furthermore, a drive mechanism 28, which constitutes a part of the exhaust control system, causes the valve stem 23 to rotate and at the same time causes both valve elements 21 and 22 of the exhaust control valve 20, which perform a motion integral with the valve stem 23, to swing with the rotational center line of the valve stem 23 as a swing center line thereof. More specifically, the drive mechanism 28 is provided with a centrifugal governor (not shown) which is drivingly connected to the crank shaft 7 and which is operated in accordance with the number of revolutions of the crank shaft and is also provided with a lever link mechanism (not shown) which is for the transfer of motion of the centrifugal governor. The lever link mechanism is interlocked to a portion of the valve stem 23 which projects outward from the ball bearing 27.

The valve stem 23 is rotated by the lever link mechanism. With the drive mechanism 28, both valve elements 21 and 22 are made swingable between a maximum projected position into the exhaust passage 11 shown in FIGS. 1 and 3 which is for an engine operation of a small intake volume, and a most retracted position into the exhaust passage 11 which is for an engine operation of a large intake volume (the control surfaces 24 and 25 in the retracted position are shown with dash-double dot lines in FIG. 3). With such swing motions of the valve elements, the exhaust control valve 20 controls the opening and closing timings of the exhaust ports 12 and 13. When both valve elements 21 and 22 occupy the retracted position, they are received within a receptacle chamber 29 which is formed as a recess in a portion of the exhaust passage 11 which forms an upper passage wall. As shown in FIG. 2, the receptacle chamber 29 forms a rear space 30 behind the control portions 21b and 22b to which rear sides 31 and 32 of the control portions 21b and 22b face, the rear sides 31 and 32 being radially opposite to the control surfaces 24 and 25 of the control portions 21b and 22b. The rear space 30 forms a part of the exhaust passage 11.

A further description will be given below about the exhaust ports 12, 13 and the valve elements 21, 22.

As shown in FIG. 3, for mitigating the abutment against a piston ring fitted on the piston 6, portions of upper edges 12a and 13a of the exhaust ports 12 and 13 close to central edges 12b and 13b formed by the reinforcing wall 19 are positioned higher than portions close to circumferential side edges 12c and 13c of the exhaust ports 12 and 13. The upper edges 12a and 13a as a whole are inclined downward away from the reinforcing wall 19 in the circumferential direction.

The side edges 12c and 13c are positioned near the scavenging port 15 positioned closest to the exhaust ports 12 and 13 in the circumferential direction. On the other hand, the control surfaces 24 and 25 are respectively formed with upper edges 24a, 25a, lower edges 24b, 25b, and circumferential side edges, the side edges respectively comprising central side edge portions 24c and 25c adjacent to the reinforcing wall 19 located at the center of the paired exhaust ports 12 and 13 and peripheral side edge portions 24d and 25d each located on the side opposite to the central side. When the valve elements 21 and 22 occupy their maximum projected positions, the lower edges 24b and 25b can be divided into top portions 24b1, 25b1 and lower portions 24b2, 25b2. The top portions 24b1 and 25b1 are the highest portions of the lower edges 24b and 25b below the central side edge portions 24c and 25c and adjacent the reinforcing wall 19. The lower portions 24b2 and 25b2, where the lower portions of the peripheral side edge portions 24d and 25d are located at the lowest position, are inclined downward from the top portions 24b1 and 25b1 toward the peripheral side edge portions 24d and 25d. At this time, the lower edges 24b and 25b of the control surfaces 24 and 25 are positioned lower than the upper edges 12a and 13a of the exhaust ports 12 and 13, and the upper edges 24a and 25a of the control surfaces 24 and 25 are positioned higher than the upper edges 12a and 13a of the exhaust ports 12 and 13, so that the control surfaces 24 and 25 can move to a position which faces the cylinder bore 5. When the control surfaces 24 and 25 occupy that position, they close upper port portions 12d and 13d which are upper portions of the exhaust ports 12 and 13, respectively.

The lower edges 24b, 25b and the upper edges 12a, 13a are formed in substantially the same shape so that the lower edges 24b and 25b of the control surfaces 24 and 25 and the upper edges 12a and 13a of he exhaust ports 12 and 13 assume positions which are substantially coincident with each other in the axial direction. Furthermore, bottoms 21b1 and 22b1 of the control portions 21b and 22b are formed as substantially flat surfaces so that the upper edges 12a and 13a of the exhaust ports 12 and 13 and the bottoms 21b1 and 22b1 of the control portions 21b and 22b afford surfaces substantially contiguous to each other from the upper edges 12a and 13a toward a downstream side of the exhaust passage 11. The valve elements 21 and 22 are formed with communication passages 33 and 34, respectively, which are a pair of through holes independent of each other and providing communication between the interior of the cylinder bore 5 and the exhaust passage 11. The pair of communication passages 33 and 34 are located at substantially symmetric positions with respect to an axial straight line passing through the center of the reinforcing wall 19. When the valve elements 21 and 22 occupy their maximum projected positions, cylinder bore-side openings 33a and 34a located at first ends of the communication passages 33 and 34 are open to lower control surface portions 24e and 25e of the control surfaces 24 and 25 positioned lower than the top portions 24b1 and 25b1 which are indicated by line A in FIG. 3, while exhaust passage-side openings 33b and 34b located at the opposite ends of the communication passages 33 and 34 are open to the rear sides 31 and 32 of the control portions 21b and 22b, respectively, as shown in FIGS. 2 and 4 and are open directly to the rear space 30 which is a part of the communication passage 11. In addition, at the lower control surface portions 24e and 25e, the cylinder bore-side openings 33a and 34a are formed near the peripheral side edge portions 24d and 25d which are positioned close to the side edges 12c and 13c in the circumferential direction of the exhaust ports 12 and 13. Thus, when the cylinder bore-side openings 33a and 34a of the communication passages 33 and 34 are opened by the piston 6, the discharge of burned gas is performed over a wide circumferential region by already opened exhaust ports 12, 13 and the communication passages 33, 34 in the vicinity of the top portions 24b1 and 25b1 of the lower edges 24b and 25b. The cylinder bore-side openings 33a and 34a of the communication passages 33 and 34 are positioned somewhat higher than the upper edge portion which is located at the highest position of the scavenging port 15.

Circumferential positions of the cylinder bore-side openings 33a and 34a in the communication passages 33 and 34 and axial positions thereof from the line A, as well as flow path sectional areas and sectional shapes of the communication passages 33 and 34, are set to optimum values by experiments, for example. The following description is now provided regarding the operation of the embodiment described above.

When the internal combustion engine 1 is operated and the number of revolutions thereof is below a first predetermined number of revolutions in a low speed region, the centrifugal governor stays in a predetermined position on a low revolution side and the lever link mechanism does not operate, so that the drive mechanism 28 does not operate and the valve elements 21 and 22 of the exhaust control valve 20 occupy their maximum projected positions. At this time, both control surfaces 24 and 25 face the cylinder bore 5 and close the upper port portions 12d and 13d of the exhaust ports 12 and 13, the opening timing of the exhaust ports is set to the maximum delay timing by the lower edges 24b and 25b of the control surfaces 24 and 25, and at the same time the closing timing of the exhaust ports 12 and 13 is set to the earliest timing.

When the valve elements 21 and 22 of the exhaust control valve 20 assume their maximum projected positions, and at the lower portions 24b2 and 25b2 of the lower control surface portions 24e and 25e close to the peripheral side edge portions 24d and 25d to which the cylinder bore-side openings 33a and 34a of the paired communication passages 33 and 34 open, the paired exhaust ports 12 and 13 are opened later than their opening timing at the top portions 24b1 and 25b1 of the lower edges 24b and 25b located near the center of the exhaust ports. Within the cylinder bore 5, the peripheral side edge portions 24d and 25d and the vicinities thereof are positioned closed to circumferential side edges 12c and 13c of the exhaust ports 12 and 13. In addition, the side edges 12c and 13c are positioned on the peripheral wall surface 5a near the scavenging ports 15 through which fresh gas (air-fuel mixture) from the scavenging passage 14 flows into the cylinder bore 5 toward the side radially opposite to the exhaust ports 12 and 13. Thus, burned gas present near the peripheral side edge portions 24d and 25d, which correspond to portions in the cylinder bore 5 where the fluidity of gas is relatively low, flows out through the communication passages 33 and 34 formed near the peripheral side edge portions 24d and 25d into the exhaust passage 11 at an earlier timing than in the background art and in an amount larger by an amount corresponding to the flow in both communication passages. Consequently, the exhaust operation is improved in a portion included in a wide circumferential region centered at the center of the paired exhaust ports 12 and 13 within the cylinder bore 5 and in which portion the fluidity of gas is relatively low. The scavenging operation that follows the exhaust operation is also improved therein and the amount of burned gas remaining in the cylinder bore 5 decreases.

Consequently, as indicated with solid lines in FIG. 5, the occurrence of irregular combustion is suppressed and the occurrence period T thereof is shortened.

Even in the event of occurrence of irregular combustion, the amount of unburned gas (air-fuel mixture) remaining in the cylinder bore at the time of misfire also decreases by an amount corresponding to the flow entering the exhaust passage 11 from the communication passages 33 and 34, Accordingly, in the next cycle, the intake volume in the cylinder bore 5, which is the sum of the amount of residual unburned gas and the amount of newly introduced fresh gas, becomes smaller than that in the background art and the combustion pressure drops. Consequently, as indicated by solid lines in FIG. 5, the pressure variation range H in the combustion chamber 9 during irregular combustion becomes narrower and vibrations induced by irregular combustion are diminished.

When the number of revolutions of the internal combustion engine 1 increases and exceeds the first predetermined number of revolutions, the lever link mechanism operates in interlock with the centrifugal governor which has started operation, and the drive mechanism 28 operates. Accordingly, the valve elements gradually swing upward and project into the exhaust passage 11 by a smaller amount, occupying an intermediate projected position between the maximum and retracted positions, whereby the opening timing of the exhaust ports 12 and 13 is quickened gradually.

At this time, while the valve elements 21 and 22 of the exhaust control valve 20 swing upward from their maximum projected positions and until when the cylinder bore-side openings 33a and 34a of the communication passages 33 and 34 are fully closed by the cylinder 3 formed with the upper edges 12a and 13a of the exhaust ports 12 and 13, and while the opening timing of the exhaust ports 12 and 13 is set to a delay timing in comparison with the maximum advance timing, the outflow of burned gas through positions close to the center of the paired exhaust ports 12 and 13 and through the communication passages 33 and 34 is done in the same state as that in which the valve elements 21 and 22 assume their maximum projected positions in an earlier stage of the descending stroke of the piston 6 as compared with that performed when the valve elements 21 and 22 assume their maximum projected positions. Accordingly, the occurrence of irregular combustion is suppressed effectively and vibrations induced by irregular combustion are diminished.

Furthermore, when the number of revolutions of the internal combustion engine 1 reaches the second predetermined number of revolutions, the operation of the centrifugal governor is stopped in a predetermined position on a high revolution side and stays in that position. The operation of the lever link mechanism is also stopped. With the drive mechanism 28 which assumes such a state, the valve elements 21 and 22 of the exhaust control valve 20 assume their retracted positions at which they are received within the receptacle chamber 29, and hold the retracted positions at a number of revolutions exceeding the second predetermined number of revolutions. At this time, the lower edges 24b and 25b of the control surfaces 24 and 25 occupy positions substantially coincident with the upper edges 12a and 13a of the exhaust ports 12 and 13, the opening timing of the exhaust ports 12 and 13 is set to the maximum advance timing by the upper edges 12a and 13a of the exhaust ports 12 and 13, and at the same time the closing timing of the exhaust ports is set to the maximum delay timing. When the valve elements 21 and 22 of the exhaust control valve 20 assume their retracted positions, the lower edges 24b and 25b of the control surfaces 24 and 25 are approximately coincident with the upper edges 12a and 13a of the exhaust ports 12 and 13, so that a dead space is not formed by the valve elements 21, 22 and the exhaust ports 12, 13 and the discharge of burned gas is performed smoothly by exhaust and scavenging operations in the descending stroke of the piston 6. In this state, the cylinder bore-side openings 33a and 34a of the communication passages 33 and 34 are fully closed with the cylinder 3, so that there is little outflow of gas from the communication passages. Since this embodiment is constructed as above, there are attained the following effects.

When the opening timing of the exhaust ports 12 and 13 is set to a delay timing including the maximum delay timing by the exhaust control valve 20, the amount of residual burned gas decreases at a portion included in a wide circumferential region centered on the center of the paired exhaust ports 12 and 13 within the cylinder bore 5 in which portion within the cylinder bore 5 the fluidity of gas is relatively low. This results in the amount of burned gas remaining in the cylinder bore 5 decreasing and the occurrence of irregular combustion being suppressed effectively, whereby the combustion stability is improved and the occurrence period of irregular combustion is shortened. Consequently, the total amount of unburned gas discharged by misfire during the period of irregular combustion decreases and hence fuel economy and exhaust emission are improved. Moreover, since the pressure variation range in the combustion chamber 9 upon occurrence of irregular combustion becomes narrower, vibrations caused by irregular combustion are diminished. Furthermore, when the opening timing of the exhaust ports 12 and 13 is set to the maximum advance timing by the exhaust control valve 20, burned gas is discharged from the exhaust ports 12 and 13 smoothly and positively, so that a high engine output is obtained. A description will be given below regarding a modification in the configuration of the above embodiment.

Although in the above embodiment, the cylinder bore-side openings 33a and 34a of the communication passages 33 and 34 are formed near the peripheral side edge portions 24d and 25d at the lower control surface portions 24e and 25e, the openings 33a and 34a may be formed in other positions away from the peripheral side edge portions 24d and 25d insofar as they are located in the lower control surface portions 24e and 25e. Also in this case, during the period from when the valve elements 21 and 22 of the exhaust control valve 20 assume their maximum projected positions until when the cylinder bore-side openings 33a and 34a of the communication passages 33 and 34 are fully closed with the upper edges 12a and 13a of the exhaust ports 12 and 13, and while the opening timing of the exhaust ports 12 and 13 is set to a delay timing including the maximum delay timing, the exhaust ports 12 and 13 are opened later than the opening timing of the exhaust ports at the top portions 24b1 and 25b1 of the lower edges 24b and 25b by the piston 6 which is in its descending stroke, at the lower control surface portions 24e and 25e and at the lower portions 24b2 and 25b2 of the lower edges 24b and 25b near the cylinder bore-side openings 33a and 34a. Consequently, burned gas present near the lower control surface portions 24e and 25e within the cylinder bore 5 flows out through the communication passages 33 and 34 into the exhaust passage 11 at an early timing in comparison with the timing in the background art and in an amount larger by an amount corresponding to the flow in both communication passages 33 and 34. Accordingly, the exhaust and scavenging actions are improved within the cylinder 5 and in the vicinity of the lower control surface portions 24e and 25e, so that the amount of burned gas remaining in the cylinder bore 5 decreases and the occurrence of irregular combustion is suppressed, whereby the combustion stability is improved and the occurrence period of irregular combustion is shortened. Moreover, like the effects obtained in the previous embodiment, both fuel economy and exhaust emission are improved, vibrations caused by irregular combustion are diminished, and a high engine output is obtained when the opening timing of the exhaust ports 12 and 13 is set to the maximum advance timing.

Although in the above embodiment one valve element 21 (22) is provided for each communication passage 33 (34), plural communication passages may be formed for each valve element 21 (22). Moreover, although the communication passages 33 and 34 used in the above embodiment are through holes, they may be slots formed in the peripheral side edge portions 24d and 25d of the valve elements 21 and 22. Furthermore, although in the above embodiment the exhaust passage-side openings 33b and 34b of the communication passages 33 and 34 are formed in the rear sides 31 and 32 of the control portions 21b and 22b, they may be opened to the bottoms 21b1 and 22b1 of the control portions 21b and 22b, allowing the communication passages to be opened directly to the exhaust passage 11. Although in the above embodiment, the exhaust ports 12 and 13, as well as the valve elements 21 and 22 of the exhaust control valve 20, are each provided in a pair, a single exhaust port and a single valve element may be adopted. Although the opening and closing timings of the exhaust ports by the exhaust control valve 20 are controlled in accordance with the number of revolutions which is one of the parameters indicating engine operating conditions, the opening and closing timings of the exhaust ports may be controlled by the exhaust control valve 20 in accordance with engine load or both the number of revolutions and engine load as the engine operating conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control system in a two-cycle internal combustion engine, the internal combustion engine including an exhaust control valve disposed in a cylinder to control opening/closing timings of an exhaust port, the cylinder being formed with an exhaust passage having an exhaust port, the exhaust port being formed in a peripheral wall surface of a cylinder bore and adapted to be opened and closed by a piston, the piston being mounted for reciprocation within the cylinder bore, said exhaust control system comprising:

said exhaust control valve includes a valve element movable between a most projected position and a most retracted position within the exhaust passage, said valve element having a control surface which, when said valve element assumes the most projected position, faces the cylinder bore and closes an upper port portion of the exhaust port and which, when said valve element assumes the most retracted position, opens the upper port portion, a lower edge portion of said control surface having a top portion and a lower portion which respectively assume a top position and a position lower than the top position when said valve element occupies the maximum projected position;

the opening timing of the exhaust port is set to a maximum delay timing when said valve element occupies the maximum projected position and is set to a maximum advance timing when said valve element occupies the maximum retracted position;

said lower edge portion of said control surface is formed in a shape which substantially coincides with a shape of an upper edge portion of the exhaust port when the valve element occupies the most retracted position; and said valve element is formed with a communication passage, a first end of said communication passage, when said valve element occupies the maximum projected position, opens to said control surface and a second end of said communication passage opens directly to the exhaust passage.

2. The exhaust control system in a two-cycle internal combustion engine according to claim 1, wherein said first end of said communication passage opens to a lower control surface portion of said control surface positioned lower than said top portion.

3. The exhaust control system in a two-cycle internal combustion engine according to claim 1, wherein said top portion of said control surface is positioned near a circumferential center of the exhaust port, said communication passage comprising a pair of communication passages formed as a pair of through holes independent of each other, and said first ends of said communication passages are open respectively to positions near peripheral end-side edges in said control surface located close to circumferential end-side edges of the exhaust port.

4. The exhaust control system in a two-cycle internal combustion engine according to claim 2, wherein said top portion of said control surface is positioned near a circumferential center of the exhaust port, said communication passage comprising a pair of communication passages formed as a pair of through holes independent of each other, and said first ends of said communication passages are open respectively to positions near peripheral end-side edges in the lower control surface portion located close to circumferential end-side edges of the exhaust port.

5. The exhaust control system in a two-cycle internal combustion engine according to claim 1, wherein said second end of said communication passage opens to a side of said valve element opposite said control surface, said communication passage extending generally perpendicular to an axis of the cylinder bore.

6. The exhaust control system in a two-cycle internal combustion engine according to claim 2, wherein said second end of said communication passage opens to a side of said valve element opposite said control surface, said communication passage extending generally perpendicular to an axis of the cylinder bore.

7. The exhaust control system in a two-cycle internal combustion engine according to claim 3, wherein said second ends of said pair of communication passages open to a side of said valve element opposite said control surface, said pair of communication passages extending generally perpendicular to an axis of the cylinder bore.

8. The exhaust control system in a two-cycle internal combustion engine according to claim 4, wherein said second ends of said pair of communication passages open to a side of said valve element opposite said control surface, said pair of communication passages extending generally perpendicular to an axis of the cylinder bore.

9. The exhaust control system in a two-cycle internal combustion engine according to claim 1, further comprising:
a valve stem mounted for rotation in the cylinder;
said valve element includes a boss portion formed integrally therewith, said boss portion being mounted on said valve stem for rotation therewith; and
a drive mechanism for rotating said valve stem and said valve element between the most projected position and the most retracted position.

10. A two-cycle internal combustion engine, comprising:
a cylinder having an exhaust passage with an exhaust port formed in a peripheral wall surface of a cylinder bore;
a piston mounted for reciprocation within said cylinder bore;
an exhaust control valve disposed in said cylinder to control opening/closing timings of said exhaust port, said exhaust port being opened and closed by said piston;
said exhaust control valve includes a valve element movable between a most projected position and a most retracted position within said exhaust passage, said valve element having a control surface which, when said valve element assumes the most projected position, faces said cylinder bore and closes an upper port portion of said exhaust port and which, when said valve element assumes the most retracted position, opens said upper port portion, a lower edge portion of said control surface having a top portion and a lower portion which respectively assume a top position and a position lower than the top position when said valve element occupies the maximum projected position;
the opening timing of said exhaust port is set to a maximum delay timing when said valve element occupies the maximum projected position and is set to a maximum advance timing when said valve element occupies the maximum retracted position;
said lower edge portion of said control surface is formed in a shape which substantially coincides with a shape of an upper edge portion of said exhaust port when said valve element occupies the most retracted position; and
said valve element is formed with a communication passage, a first end of said communication passage, when said valve element occupies the maximum projected position, opens to said control surface and a second end of said communication passage opens directly to said exhaust passage.

11. The two-cycle internal combustion engine according to claim 10, wherein said first end of said communication passage opens to a lower control surface portion of said control surface positioned lower than said top portion.

12. The two-cycle internal combustion engine according to claim 10, wherein said top portion of said control surface is positioned near a circumferential center of said exhaust port, said communication passage comprising a pair of communication passages formed as a pair of through holes independent of each other, and said first ends of said communication passages are open respectively to positions near peripheral end-side edges in said control surface located close to circumferential end-side edges of said exhaust port.

13. The two-cycle internal combustion engine according to claim 11, wherein said top portion of said control surface is positioned near a circumferential center of said exhaust port, said communication passage comprising a pair of communication passages formed as a pair of through holes independent of each other, and said first ends of said communication passages are open respectively to positions near peripheral end-side edges in the lower control surface portion located close to circumferential end-side edges of said exhaust port.

14. The two-cycle internal combustion engine according to claim 10, wherein said second end of said communication passage opens to a side of said valve element opposite said control surface, said communication passage extending generally perpendicular to an axis of said cylinder bore.

15. The two-cycle internal combustion engine according to claim 11, wherein said second end of said communication passage opens to a side of said valve element opposite said control surface, said communication passage extending generally perpendicular to an axis of said cylinder bore.

16. The two-cycle internal combustion engine according to claim 12, wherein said second ends of said pair of communication passages open to a side of said valve element opposite said control surface, said pair of communication passages extending generally perpendicular to an axis of said cylinder bore.

17. The two-cycle internal combustion engine according to claim 13, wherein said second ends of said pair of communication passages open to a side of said valve element opposite said control surface, said pair of communication passages extending generally perpendicular to an axis of said cylinder bore.

18. The two-cycle internal combustion engine according to claim 10, further comprising:

a valve stem mounted for rotation in said cylinder;

said valve element includes a boss portion formed integrally therewith, said boss portion being mounted on said valve stem for rotation therewith; and a drive mechanism for rotating said valve stem and said valve element between the most projected position and the most retracted position.

* * * * *